United States Patent
Okumura (10) Patent No.: US 9,534,910 B2
(45) Date of Patent: Jan. 3, 2017

(54) AUTONOMOUS VEHICLE DETECTION OF AND RESPONSE TO YIELD SCENARIOS

(71) Applicant: Toyota Motor Engineering & Manufacturing North America, Inc., Erlanger, KY (US)

(72) Inventor: Bunyo Okumura, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/565,265

(22) Filed: Dec. 9, 2014

(65) Prior Publication Data

US 2016/0161270 A1    Jun. 9, 2016

(51) Int. Cl.
| | |
|---|---|
| *G01C 21/34* | (2006.01) |
| *B60W 30/00* | (2006.01) |
| *B60W 30/18* | (2012.01) |
| *G05D 1/02* | (2006.01) |
| *G06K 9/00* | (2006.01) |

(Continued)

(52) U.S. Cl.
CPC ............. *G01C 21/34* (2013.01); *B60W 30/00* (2013.01); *B60W 30/181* (2013.01); *B60W 30/18154* (2013.01); *B60W 30/18163* (2013.01); *G05D 1/021* (2013.01); *G06K 9/00805* (2013.01); *G06K 9/00825* (2013.01); *G08G 1/09626* (2013.01); *G08G 1/09675* (2013.01); *G08G 1/096725* (2013.01); *G08G 1/096775* (2013.01);

(Continued)

(58) Field of Classification Search
CPC .............................. G01C 21/34; B60W 30/00
USPC .................................................................. 701/23
See application file for complete search history.

(56) References Cited

U.S. PATENT DOCUMENTS

| 8,712,624 | B1 | 4/2014 | Ferguson et al. |
| 2008/0162027 | A1 | 7/2008 | Murphy et al. |
| 2013/0253754 | A1* | 9/2013 | Ferguson ............. G05D 1/0231 701/28 |

FOREIGN PATENT DOCUMENTS

GB    2510698 A    8/2014

OTHER PUBLICATIONS

Gustafsson; "Automated Drive Environments and Decision Making"; Master's Thesis in Systems, Control and Mechatronics for Chalmers University of Technology; 2013; in 41 pages; Gothenburg, Sweden.

(Continued)

*Primary Examiner* — Aaron L Troost
(74) *Attorney, Agent, or Firm* — Christopher G. Darrow; Darrow Mustafa PC (57) ABSTRACT

An automated driving system and methods are disclosed. The automated driving system includes a perception system disposed on an autonomous vehicle. The automated driving system can detect an intersection including a yield scenario and identify a check point between the autonomous vehicle and the yield scenario. Prior to the autonomous vehicle reaching the check point, the automated driving system can send a command to one or more vehicle systems to control the autonomous vehicle to stop at the yield scenario. After the autonomous vehicle reaches the check point, the automated driving system can detect, using the perception system, information for the intersection. If the information indicates clear passage through the intersection for the autonomous vehicle, the automated driving system can send (Continued)

a command to the one or more vehicle systems to drive the autonomous vehicle through the intersection.

17 Claims, 3 Drawing Sheets

(51) Int. Cl.
*G08G 1/0962* (2006.01)
*G08G 1/0967* (2006.01)
*G08G 1/16* (2006.01)

(52) U.S. Cl.
CPC .............. *G08G 1/165* (2013.01); *G08G 1/166* (2013.01); *G08G 1/167* (2013.01)

(56) References Cited

OTHER PUBLICATIONS

Alonso et al.; "Autonomous vehicle control systems for safe crossroads"; Transportation Research Part C—emerging Technologies; Dec. 2011; in 16 pages; vol. 19, Issue 6.

Perez et al.; "Autonomous driving manoeuvres in urban road traffic environment: a study on roundabouts"; Proceedings of the 18th World Congress of the International Federation of Automatic Control; Aug. 28-Sep. 2, 2011; pp. 13795-13800; Milano, Italy.

Azimi et al.; "V2V-Intersection Management at Roundabouts"; SAE Int. J. Passeng. Cars; Aug. 4, 2013; pp. 681-690; vol. 6, Issue 2.

PCT International Search Report and Written Opinion for International Application No. PCT/US2015/063926, mailed Feb. 24, 2016 (13 pages).

\* cited by examiner

AUTONOMOUS VEHICLE DETECTION OF AND RESPONSE TO YIELD SCENARIOS

BACKGROUND

Fully or highly automated driving systems are designed to operate a vehicle on the road without driver interaction or other external control, for example, self-driving vehicles or autonomous vehicles. Autonomous vehicles are thus configured to make driving decisions in a manner consistent with manual control. These driving decisions can become complicated, consuming processing power in complex situations such as at intersections. This is especially true for driving decisions at yield scenarios, that is, where the autonomous vehicle must determine whether to proceed into an intersection with caution to avoid neighboring vehicles or to stop and wait, i.e. yield, until any neighboring vehicles have cleared the intersection.

Prior art driving systems include means for dynamically generating trajectories to navigate an intersection and for sectioning an intersection into a grid of segments to determine when vehicles should occupy specific segments of the intersection. In order to provide more stable driving behavior at an intersection while taking into account both the complexity of the traffic environment and the accuracy of information captured by the automated driving system about the traffic environment, the autonomous vehicle should be configured to differentiate between instances where minimum environment information is needed and where detailed environment information is needed to safely implement autonomous decision making at the intersection.

SUMMARY

Methods and systems for automated driving in the presence of yield scenarios are described below. An autonomous vehicle can identify an intersection including a yield scenario, the yield scenario including features such as a yield sign, a red traffic light, a roundabout, or a lane merge, and collect preliminary information about the intersection. Based on the preliminary information, the automated driving system can choose a location for a check point between the autonomous vehicle and the yield scenario. Before the check point, the autonomous vehicle can be controlled to stop at the yield scenario until at least the check point.

After the check point, the autonomous vehicle can be configured to collect updated, more detailed information about the intersection and decide whether to stop at the yield scenario or to enter the intersection at the yield scenario. Check points can be positioned close to the entrance of an intersection, for example, when the intersection is congested with traffic or includes a complicated geometry. By positioning the check point near the intersection, the automated driving system can capture more accurate information about the intersection and more easily detect and track neighboring vehicles within the intersection. The more accurate and timely the information collected about the complicated intersection, the more stable the behavior of the autonomous vehicle.

Conversely, check points can be positioned further from the entrance of the intersection when the intersection is clear of traffic or includes a simple geometry. In such an environment, the autonomous vehicle is capable of stable behavior without additional information captured closer to the intersection because the traffic environment of the intersection is stable. The use of a checkpoint also allows the automated driving system to conserve processing power and more efficiently make decisions.

In one implementation, an automated driving system is disclosed. The automated driving system includes a perception system disposed on an autonomous vehicle and a computing device in communication with the perception system. The computing device includes one or more processors for controlling operations of the computing device and a memory for storing data and program instructions used by the one or more processors. The one or more processors are configured to execute instructions stored in the memory to: detect preliminary information for an intersection including a yield scenario; identify a check point between the autonomous vehicle and the yield scenario based on the preliminary information; prior to the autonomous vehicle reaching the check point, send a command to one or more vehicle systems to control the autonomous vehicle to stop at the yield scenario; after the autonomous vehicle reaches the check point, detect, using the perception system, updated information for the intersection; and if the updated information indicates clear passage through the intersection for the autonomous vehicle, send a command to the one or more vehicle systems to drive the autonomous vehicle past the yield scenario and through the intersection.

In another implementation, a computer-implemented method of automated driving is disclosed. The method includes detecting preliminary information for an intersection including a yield scenario; identifying a check point between an autonomous vehicle and the yield scenario based on the preliminary information; prior to the autonomous vehicle reaching the check point, sending a command to one or more vehicle systems to control the autonomous vehicle to stop at the yield scenario; after the autonomous vehicle reaches the check point, detecting, using a perception system disposed on the autonomous vehicle, updated information for the intersection; and if the updated information indicates clear passage through the intersection for the autonomous vehicle, sending a command to the one or more vehicle systems to drive the autonomous vehicle past the yield scenario and through the intersection.

In another implementation, a computing device is disclosed. The computing device includes one or more processors for controlling operations of the computing device and a memory for storing data and program instructions used by the one or more processors. The one or more processors are configured to execute instructions stored in the memory to: detect an intersection including a yield scenario; identify a check point between the autonomous vehicle and the yield scenario; prior to the autonomous vehicle reaching the check point, send a command to one or more vehicle systems to control the autonomous vehicle to stop at the yield scenario; after the autonomous vehicle reaches the check point, detect, using the perception system, information for the intersection; and if the information indicates clear passage through the intersection for the autonomous vehicle, send a command to the one or more vehicle systems to drive the autonomous vehicle through the intersection.

BRIEF DESCRIPTION OF THE DRAWINGS

The description herein makes reference to the accompanying drawings wherein like reference numerals refer to like parts throughout the several views, and wherein.

DETAILED DESCRIPTION

An automated driving system for an autonomous vehicle is disclosed. The automated driving system is configured to detect an intersection including a yield scenario. The intersection can be detected, for example, using map-based information from a remote map server. The yield scenario can include a yield sign, a lane merge situation, a red traffic light allowing a right turn on red, or any other situation where the autonomous vehicle is required to yield to other traffic before proceeding through the intersection. Once the yield scenario is identified, the automated driving system can identify a check point between the current location of the autonomous vehicle and the yield scenario. Before the check point, the autonomous vehicle can be configured to stop at the yield scenario. After the check point, the autonomous vehicle can collect updated information about the intersection, the updated information including information related to neighboring vehicles near the intersection, and make driving decisions based on the updated information. These driving decisions can include continuing to stop at the yield scenario or proceeding through the intersection if clear passage is available.

Figure 1:
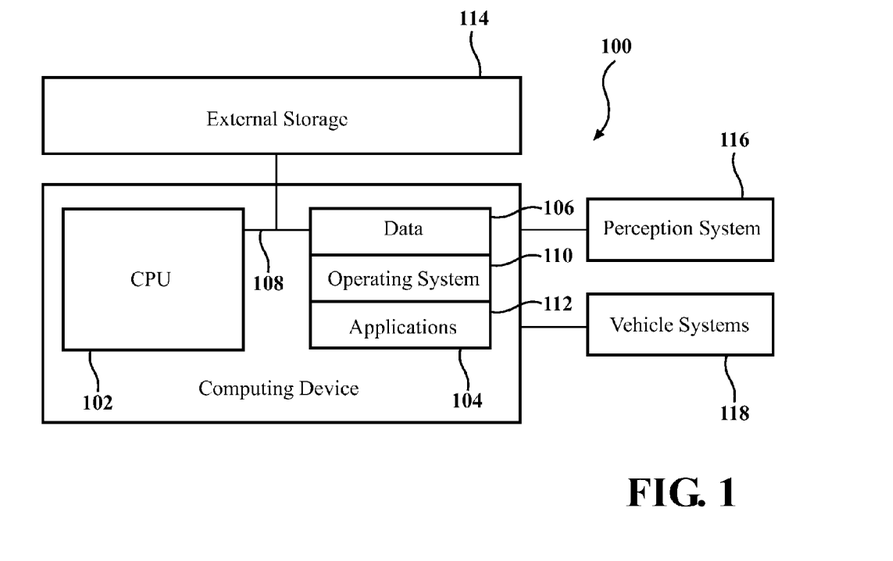
FIG. 1 is a block diagram of a computing device.

FIG. 1 is a block diagram of a computing device 100, for example, for use with an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can be configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle. Information specific to the environment surrounding a vehicle can include information specific to the structure of an intersection or information related to objects such as neighboring vehicles proximate to an intersection ahead of the autonomous vehicle or any other localized position data and/or signals that can be captured and sent to the CPU 102.

In the examples described below, the perception system 116 can be configured to capture, at least, images for an image-based sensor system such that the computing device 100 can detect the configuration of an intersection and the presence, position, and orientation of neighboring vehicles within the images. The computing device 100 can also be in communication with one or more vehicle systems 118, such as a vehicle braking system, a vehicle propulsion system, a vehicle steering system, etc. The vehicle systems 118 can also be in communication with the perception system 116, the perception system 116 being configured to capture data indicative of performance of the various vehicle systems 118.

Figure 2:
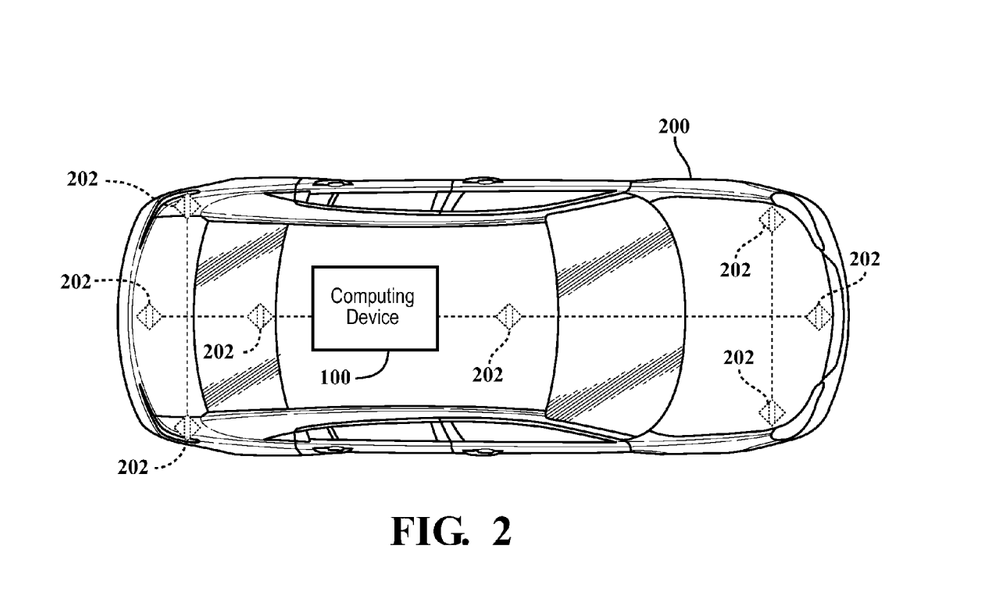
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

The autonomous vehicle 200 can also include a plurality of sensors 202, the sensors 202 being part of the perception system 116 described in reference to FIG. 1. One or more of the sensors 202 shown can be configured to capture images for processing by an image sensor, vehicle position in global coordinates based on signals from a plurality of satellites, the distance to objects within the surrounding environment for use by the computing device 100 to estimate position and orientation of the autonomous vehicle 200 and the objects such as neighboring vehicles within the surrounding environment, or any other data and/or signals that could be used to determine the current state of the autonomous vehicle 200 or determine the current state of the surrounding environment including the presence of, position of, and orientation of neighboring vehicles in reference to an intersection.

Figure 3:
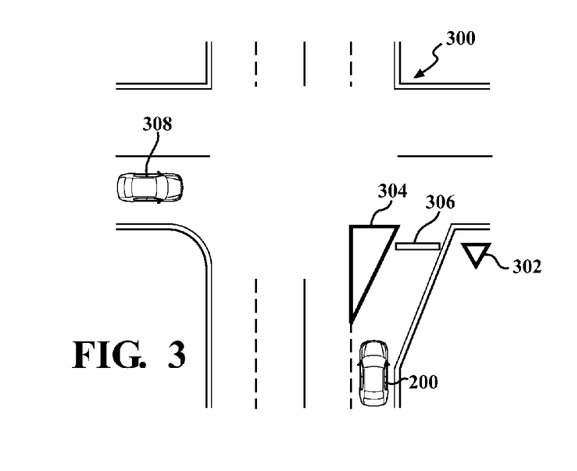
FIG. 3 shows a cross-shaped intersection including an obstructed yield scenario for the autonomous vehicle of FIG. 2.

FIG. 3 shows a cross-shaped intersection 300 including an obstructed yield scenario for the autonomous vehicle 200 of FIG. 2. The automated driving system can be configured to detect preliminary information for the intersection 300. The preliminary information can include map-based information such as the type of intersection 300 and the configuration of the intersection 300. For example, the map-based information can include the position of exits and entrances to the intersection 300, the lane structure of the intersection 300, the presence of, position of, and status of traffic signs, such as a yield sign 302, associated with the intersection 300, the position of fixed objects such as a berm 304 at the entrance of the intersection 300, etc. The preliminary information can also include traffic density information for the intersection 300. Traffic density information can indicate a general congestion level for the intersection 300 without identifying individual vehicles present at the intersection 300. This preliminary information can be accessed by the automated driving system from a remote location, for example, from a remote map database.

The autonomous vehicle 200 can also be configured to identify a yield scenario at the intersection 300 based on the preliminary information. In this example, the yield scenario can be identified based on the presence of the yield sign 302 along the planned path for the autonomous vehicle 200. Other example yield scenarios can be identified based on the presence of a red traffic light, a roundabout, and a lane merge situation. The identification of the yield scenario can be based both on the position of the autonomous vehicle 200 in respect to the intersection 300 and the preliminary information identified for the intersection 300.

Once the yield scenario is identified, the automated driving system can identify a check point 306 between the autonomous vehicle 200 and the yield scenario. The check point 306 can represent the location at which the autonomous vehicle 200 will be required to make a decision whether to enter the intersection 300 or stop at the yield scenario. In FIG. 3, for example, the check point 306 is located very close to the yield sign 302 and near the end of the berm 304. The location chosen for the check point 306 can be based on the preliminary information identified for the intersection 300. For example, because the berm 304 is an obstacle that could at least partially obstruct the view of the intersection 300 from the autonomous vehicle 200, the check point 306 can be positioned close to the intersection 300. Other factors impacting the selection of the location of the check point 306 can include the traffic density information, e.g., higher traffic density would lead to a check point 306 close to the intersection 300, and the type and configuration of the intersection, e.g., a complicated intersection would lead to a check point 306 close to the intersection 300.

After the check point 306 has been identified, but before the autonomous vehicle 200 reaches the check point 306 along its planned path, the automated driving system can be configured to send a command to one or more of the vehicle systems 118 to control the autonomous vehicle 200 to stop at the yield scenario. In the example of FIG. 3, the autonomous vehicle 200 can be controlled to decelerate in order to stop adjacent to the yield sign 302, i.e., at the yield scenario. Here, the position of the check point 306 is also adjacent to the yield sign 302, meaning that the autonomous vehicle 200 would be controlled to stop at approximately the location of the check point 306. The check point 306 location and the yield scenario location are the same in this example because of the obstructed nature of the intersection 300.

After the autonomous vehicle 200 reaches the check point 306, the automated driving system can be configured to detect updated information for the intersection using, for example, image-based sensors 202 as part of the perception system 116. The updated information can include information regarding intersection obstacles, such as the berm 304, and/or information regarding one or more neighboring vehicles, such as neighboring vehicle 308. The berm 304 and the neighboring vehicle 308 can be recognized using, for example, image-based or LIDAR sensors 202 disposed on the autonomous vehicle 200. The autonomous vehicle 200 can also use the perception system 116 to collect information about the neighboring vehicle 308 such as its size within an image (to determine distance), its position, its orientation in respect to the intersection 300 or the autonomous vehicle 200, or its velocity, acceleration, deceleration, etc.

If the updated information indicates clear passage through the intersection 300, for example, if the neighboring vehicle 308 is sufficiently distant, traveling at a low speed, or turning right at the intersection 300, the automated driving system can send a command to one or more of the vehicle systems 118 to drive the autonomous vehicle 200 past the yield scenario and through the intersection 300 without, for example, waiting for the neighboring vehicle 308. However, if the updated information does not indicate clear passage through the intersection 300 for the autonomous vehicle 200, for example, if the neighboring vehicle 308 is already entering the intersection 300 or is accelerating toward the intersection 300, the automated driving system can be configured to send a command to the one or more vehicle systems 118 to control the autonomous vehicle to stop at the yield scenario. In the example of FIG. 3, the autonomous vehicle 200 would already be stopped at the yield scenario, so the autonomous vehicle 200 would remain stopped, for example, proximate to the yield sign 302, until additional updated information could be collected that does indicate clear passage through the intersection 300.

Figure 4:
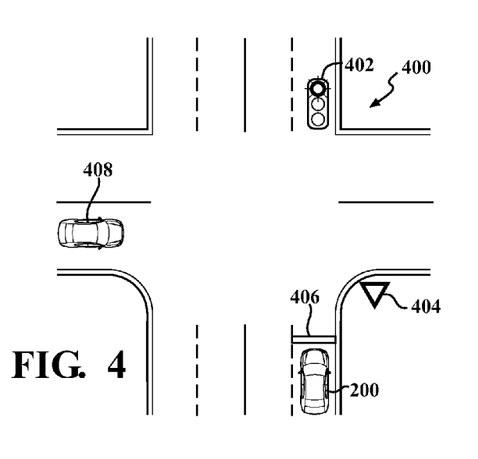
FIG. 4 shows another cross-shaped intersection including a stop-light based yield scenario for the autonomous vehicle of FIG. 2.

FIG. 4 shows another cross-shaped intersection 400 including a stop-light based yield scenario for the autonomous vehicle 200 of FIG. 2. In this example, the automated driving system can detect preliminary information for the intersection 400 that identifies the presence of a red traffic light 402 in the planned path of the autonomous vehicle 200. Based on the presence of a red traffic light 402 and the position of the autonomous vehicle 200 in a right hand lane, the yield scenario is identified when the planned path of the autonomous vehicle 200 includes a right turn at the intersection 400, i.e., a right-turn-on-red yield scenario. The yield scenario in this example is marked with a yield sign 404 to represent the yield scenario, though no physical sign need be present at this type of yield scenario.

The automated driving system can also identify a check point 406 between the autonomous vehicle 200 and the yield scenario. The check point 406 in this example is located in a position close to but before a location where the autonomous vehicle 200 would be required to stop at the red traffic light 402. The location chosen for the check point 406 can be based on the preliminary information identified for the intersection 400. Because the presence of the red traffic light 402 requires the autonomous vehicle 200 to stop at the intersection 400, the check point 406 can be positioned close to the normal stopping location for the autonomous vehicle 200 at the intersection 400.

As in the previous example, before the check point 406 is reached, the automated driving system can be configured to send a command to one or more of the vehicle systems 118 to control the autonomous vehicle 200 to stop at the yield scenario. In the example of FIG. 4, the autonomous vehicle 200 can be controlled to decelerate in order to stop at approximately the location of the check point 406. Again, the location of the check point and the yield scenario location represented by the yield sign 404 are approximately the same in this example because of the requirement that the autonomous vehicle 200 stop at the red traffic light 402.

After the autonomous vehicle 200 reaches the check point 406, the automated driving system can be configured to detect updated information for the intersection. By waiting until the check point 406 is reached to collect updated information related to the intersection 400, the autonomous vehicle 200 can conserve processing power. The updated information can include information regarding the neighboring vehicle 408. The autonomous vehicle 200 can use the perception system 116 to collect information about the neighboring vehicle 408 such as its size within an image (to determine distance), its position, its orientation in respect to the intersection 400 or the autonomous vehicle 200, or its velocity, acceleration, deceleration, etc.

If the neighboring vehicle 408 is sufficiently distant from the intersection 400, traveling at a low speed, or turning right at the intersection 400, the automated driving system can send a command to one or more of the vehicle systems 118 to turn the autonomous vehicle 200 right at the intersection 400 without, for example, waiting for the neighboring vehicle 408 to proceed through the intersection 400. However, if the neighboring vehicle 408 is accelerating toward or already within the intersection 400, the autonomous vehicle 200 can stop at the location of the yield scenario and wait for the neighboring vehicle 408 to pass before turning right at the intersection 400.

Figure 5:
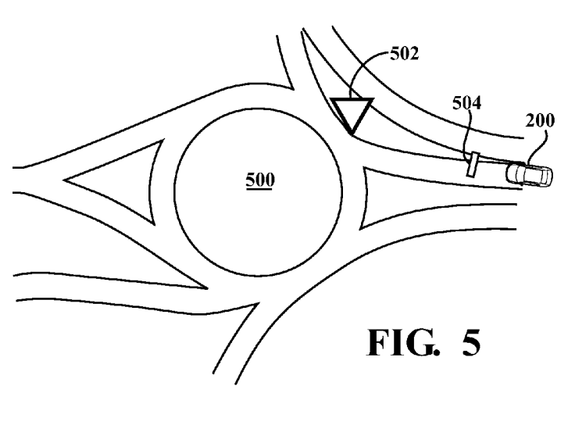
FIG. 5 shows a roundabout including a yield scenario for the autonomous vehicle of FIG. 2.
Figure 6:
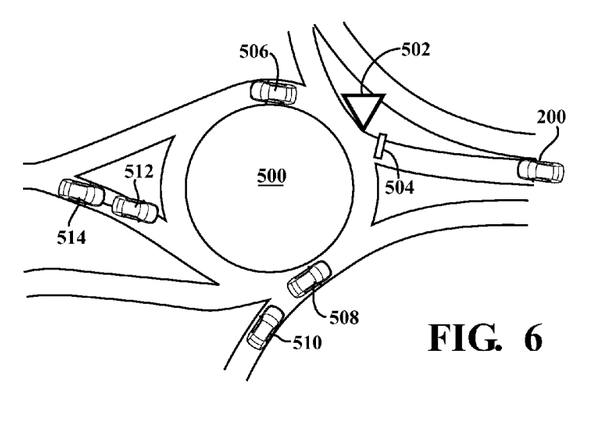
FIG. 6 shows the roundabout of FIG. 5 congested with neighboring vehicles proximate to the autonomous vehicle of FIG. 2.

FIGS. 5 and 6 show a roundabout 500 including a yield scenario for the autonomous vehicle 200 of FIG. 2. In these examples, the automated driving system can detect preliminary information for the intersection that identifies the presence of the roundabout 500 in the planned path of the autonomous vehicle 200, for example, within map information available remotely. The presence of the roundabout 500 indicates a yield scenario based on traffic rules generally associated with roundabouts, namely, that vehicles entering must yield to vehicles already within the roundabout 500. The yield scenario in this example is marked with a yield sign 502 to represent the yield scenario, though no physical sign need be present at this type of yield scenario.

The automated driving system can also identify a check point 504 between the autonomous vehicle 200 and the yield scenario. In the example of FIG. 5, the check point 504 is located far in advance of the roundabout 500 based on preliminary information captured for the roundabout 500 indicating a low traffic density, i.e., that little traffic is present within the roundabout 500. Alternatively, in FIG. 6, the check point 504 is located very near the entrance of the roundabout 500 based on preliminary information captured for the roundabout 500 indicating that dense traffic is present within the roundabout 500 in the form of neighboring vehicles 506, 508, 510, 512, and 514.

As in the previous examples, before the check point 504 is reached, the automated driving system can be configured to send a command to one or more of the vehicle systems 118 to control the autonomous vehicle 200 to stop at the yield scenario. In FIG. 5, the autonomous vehicle 200 would decelerate for a short time before reaching the check point 504. In FIG. 6, deceleration would occur for a longer period of time, up until the autonomous vehicle 200 reaches the point of the yield scenario indicated by the yield sign 502. The autonomous vehicle 200 will likely be decelerating to a stop in FIG. 6 given the location of the check point 504 in relation to the entrance of the roundabout 500.

After the autonomous vehicle 200 reaches the check point 504, the automated driving system can be configured to detect updated information for the intersection. In FIG. 5, the updated information will include specific traffic detail that no vehicles are present within the roundabout 500, indicating a clear path for the autonomous vehicle 200 to proceed through the intersection. In FIG. 6, the updated information will include information about the neighboring vehicles 506, 508, and potentially even the neighboring vehicles 510, 512, and 514, though the latter of these have not yet entered the roundabout 500. The updated information collected in FIG. 6 can include position, velocity, acceleration, deceleration, etc. for at least the neighboring vehicles 506, 508.

In the FIG. 5 example, after the autonomous vehicle 200 has passed the check point 504 and collected the updated information regarding a clear roundabout 500, the automated driving system can send a command to one or more vehicle systems 118 to proceed through the roundabout 500. Thus, the autonomous vehicle 200 will no longer be controlled to decelerate toward a stop after the check point 504, and instead, will be controlled to traverse the roundabout 500. Alternatively, in the FIG. 6 example, once the autonomous vehicle 200 reaches the check point 504, the updated information collected will indicate that at least the neighboring vehicle 508 has the right of way within the roundabout 500, and the autonomous vehicle 200 will be controlled to stop before entering the roundabout 500 to allow the neighboring vehicle 508 to pass.

In each of the examples described in FIGS. 3-6, a check point positioned closely to the yield scenario allows for a more conservative maneuver to enter the intersection because the autonomous vehicle 200 will decelerate up until the check point, often stopping completely. Though the autonomous vehicle 200 is described as being controlled to decelerate in each of the examples of FIGS. 3-6, depending on the speed of the autonomous vehicle 200 and the structure and/or and terrain of the intersection, the autonomous vehicle 200 may need to be controlled to accelerate or maintain its speed in order to reach the stopping point of the yield scenario.

Further, when the check point is positioned closely to the yield scenario in a complex traffic environment, the perception system 116 of the autonomous vehicle 200 is able to capture more accurate information about the intersection, improving decision making processes. Conversely, check points positioned further from simple or clear intersections allow the autonomous vehicle 200 to proceed smoothly and quickly through a yield scenario because simple or clear intersections are stable traffic environments. It should be noted that once a check point is passed, the autonomous vehicle 200 can still change its intersection entry decision depending on additional information received from the perception system 116 to ensure safety.

Figure 7:
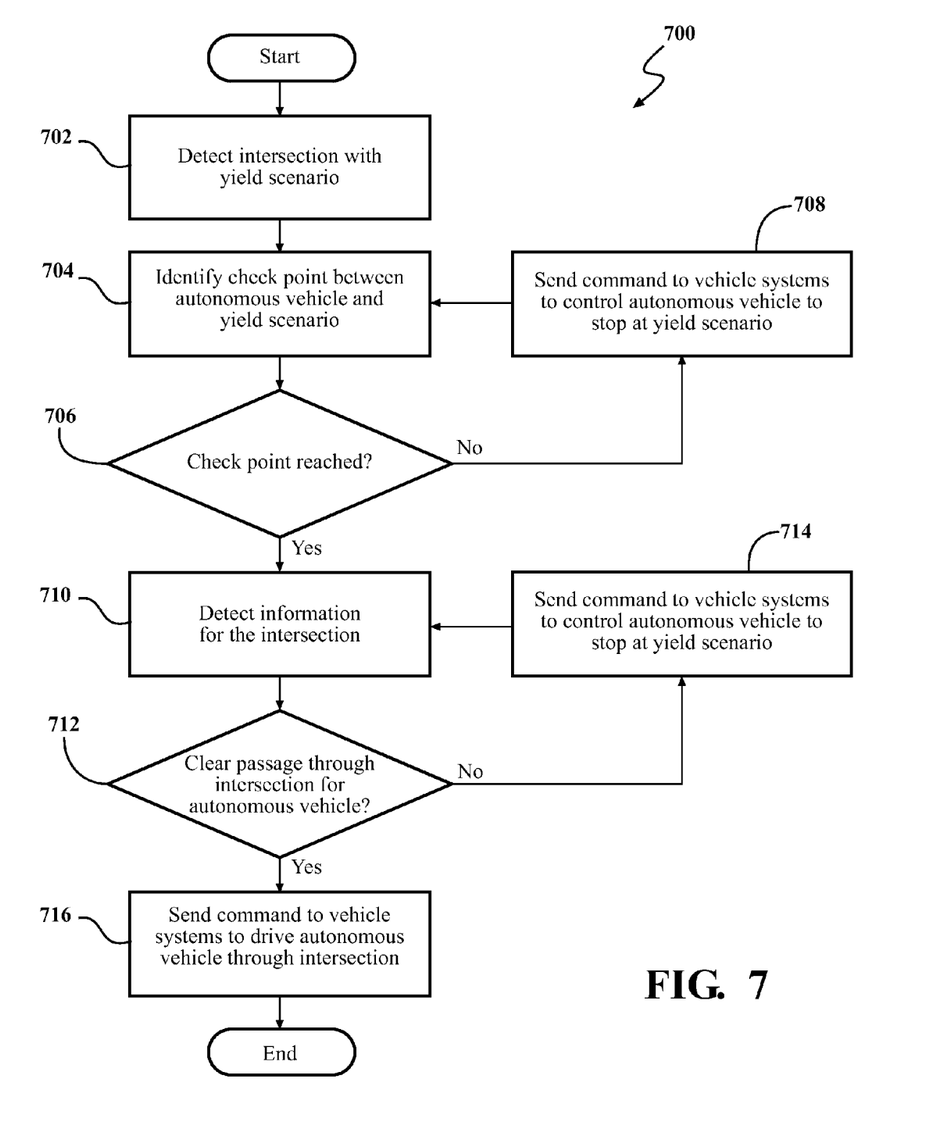
FIG. 7 is a logic flowchart of a yield scenario detection and response process performed by the automated driving system.

FIG. 7 is a logic flowchart of a yield scenario detection and response process 700 performed by the automated driving system. In step 702 of the process 700, the automated driving system can detect an intersection including a yield scenario, such as intersections 300, 400, 500 and yield scenarios represented by actual or inferred yield signs 302, 404, and 502 in FIGS. 3-6. As described previously, the yield scenarios can include yield signs, red traffic lights, roundabouts, lane merges, or other traffic signals indicating a location where the autonomous vehicle 200 must yield to traffic having a higher priority to pass through the intersection. The yield scenarios can be identified based on preliminary information for the intersection, such as map-based information and traffic density information. Map-based information can include the type of intersection and the configuration of the intersection.

In step 704 of the process 700, the automated driving system can identify a check point between the autonomous vehicle 200 and the yield scenario, such as check points 306, 406, and 504 in FIGS. 3-6. The location of the check point can be based on the preliminary information collected by the autonomous vehicle 200. This check point location will be further from the intersection if the preliminary information indicates a simple configuration for the intersection or that the intersection is clear of traffic and closer to the intersection if the preliminary information indicates a complex configuration for the intersection or that the intersection is congested with traffic.

In decision block 706, the automated driving system can determine whether the check point has been reached by the autonomous vehicle 200. If the autonomous vehicle 200 has not reached the check point, the automated driving system can send a command to one or more vehicle systems to control the autonomous vehicle to stop at the yield scenario at step 708, and the process 700 can return to step 704 where the check point is again identified between the autonomous vehicle 200 and the yield scenario. The autonomous vehicle 200 will continue to be controlled to stop at the yield scenario up to the location of the check point. If the autonomous vehicle 200 reaches the check point, the process 700 continues to step 710, and the automated driving system can detect information for the intersection. The information detected can be updated information, that is, additional or different information than was collected as preliminary information prior to the check point.

The updated information collected can include information regarding obstacles within the intersection, such as pedestrians, cyclists, etc. or information regarding one or more neighboring vehicles proximate to the intersection, such as neighboring vehicles 308, 408, 506, 508, 510, 512, and 514 in FIGS. 3-6. Information collected about neighboring vehicles can include the position, velocity, acceleration, or deceleration associated with the neighboring vehicles such that the ability of the autonomous vehicle 200 to enter the intersection can be calculated in relation to the projected paths of the neighboring vehicles. By waiting until the checkpoint to collect updated information, the autonomous vehicle 200 can conserve processing power.

After the information is detected for the intersection in step 710, the process 700 continues to decision block 712, and the automated driving system determines whether clear passage exists through the intersection for the autonomous vehicle 200. Clear passage can include any situation where the autonomous vehicle 200 can safely navigate the intersection without waiting for obstacles or neighboring vehicles present in the intersection to proceed through the intersection. If no clear passage is present, the process 700 moves to step 714, and the automated driving system sends a command to one or more vehicle systems 118 to stop the autonomous vehicle 200 at the yield scenario, and the process returns to step 710 where additional information is collected for the intersection, again, in order to identify clear passage.

If clear passage through the intersection for the autonomous vehicle 200 is present, the process 700 moves to step 716, and the automated driving system sends a command to one or more vehicle systems 118 to drive the autonomous vehicle 200 through the intersection. After step 716, the process 700 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. An automated driving system, comprising:
   a perception system disposed on an autonomous vehicle; and
   a computing device in communication with the perception system, comprising:
      one or more processors for controlling operations of the computing device; and
      a memory for storing data and program instructions used by the one or more processors,
      wherein the one or more processors are configured to execute instructions stored in the memory to:
         detect preliminary information for an intersection including a yield scenario;
         identify a check point location between the autonomous vehicle and the yield scenario based on the preliminary information including at least one of traffic density information, an intersection type, an intersection configuration, or a presence of one or more obstacles that could at least partially obstruct a view of the intersection by the autonomous vehicle;
         prior to the autonomous vehicle reaching the check point location, send a command to one or more vehicle systems to control me autonomous vehicle to stop at the yield scenario;
         after the autonomous vehicle reaches the check point location, detect, using the perception system, updated information for the intersection; and
         when the updated information indicates clear passage through the intersection for the autonomous vehicle, send a command to the one or more vehicle systems to drive the autonomous vehicle past the yield scenario and through the intersection.

2. The automated driving system of claim 1, wherein the yield scenario includes one of a yield sign, a red traffic light, a roundabout, and a lane merge.

3. The automated driving system of claim 1, wherein the updated information includes at least one of information regarding intersection obstacles and information regarding one or more neighboring vehicles.

4. The automated driving system of claim 3, wherein the information regarding the one or more neighboring vehicles includes at least one of position, velocity, acceleration, and deceleration for the one or more neighboring vehicles.

5. The automated driving system of claim 1, wherein the one or more processors are further configured to:
   if the updated information does not indicate clear passage through the intersection for the autonomous vehicle, send a command to the one or more vehicle systems to stop the autonomous vehicle at the yield scenario.

6. The automated driving system of claim 1, wherein detecting the updated information for the intersection is performed regardless of the yield scenario.

7. A computer implemented method of automated driving, comprising:
   detecting preliminary information for an intersection including a yield scenario;
   identifying a check point location between an autonomous vehicle and the yield scenario based on the preliminary information including at least one of traffic density information, an intersection type, an intersection configuration, or a presence of one or more obstacles that could at least partially obstruct a view of the intersection by the autonomous vehicle;
   prior to the autonomous vehicle reaching the check point location, sending a command to one or more vehicle systems to control the autonomous vehicle to stop at the yield scenario;
   after the autonomous vehicle reaches the check point location, detecting, using a perception system disposed on the autonomous vehicle, updated information for the intersection; and
   when the updated information indicates clear passage through the intersection for the autonomous vehicle, sending a command to the one or more vehicle systems to drive the autonomous vehicle past the yield scenario and through the intersection.

8. The method of claim 7, wherein the yield scenario includes one of a yield sign, a red traffic light, a roundabout, and a lane merge.

9. The method of claim 7, wherein the updated information includes at least one of information regarding intersection obstacles and information regarding one or more neighboring vehicles.

10. The method of claim 9, wherein the information regarding the one or more neighboring vehicles includes at least one of position, velocity, acceleration, and deceleration for the one or more neighboring vehicles.

11. The method of claim 7, further comprising:
if the updated information does not indicate clear passage through the intersection for the autonomous vehicle, send a command to the one or more vehicle systems to stop the autonomous vehicle at the yield scenario.

12. A computing device, comprising:
one or more processors for controlling operations of the computing device; and
a memory for storing data and program instructions used by the one or more processors, wherein the one or more processors are configured to execute instructions stored in the memory to:
detect an intersection including a yield scenario:
identify a check point location between an autonomous vehicle and the yield scenario based on at least one of traffic density information, intersection type, intersection configuration, or a presence of one or more obstacles that could at least partially obstruct a view of the intersection by the autonomous vehicle;
prior to the autonomous vehicle reaching the check point location, send a command to one or more vehicle systems to control the autonomous vehicle to stop at the yield scenario;
after the autonomous vehicle reaches the check point location, detect, using a perception system, information for the intersection; and
when the information indicates clear passage through the intersection for the autonomous vehicle, send a command to the one or more vehicle systems to drive the autonomous vehicle through the intersection.

13. The computing device of claim 12, wherein the yield scenario includes one of a yield sign, a red traffic light, a roundabout, and a lane merge.

14. The computing device of claim 12, wherein the information for the intersection includes at least one of map-based information and information regarding intersection obstacles and information regarding one or more neighboring vehicles.

15. The computing device of claim 14, wherein the map-based information includes at least one of an intersection type and an intersection configuration.

16. The computing device of claim 14, wherein the information regarding the one or more neighboring vehicles includes at least one of position, velocity, acceleration, and deceleration for the one or more neighboring vehicles.

17. The computing device of claim 12, wherein the one or more processors are further configured to:
if the information does not indicate clear passage through the intersection for the autonomous vehicle, send a command to the one or more vehicle systems to stop the autonomous vehicle at the yield scenario.

* * * * *

UNITED STATES PATENT AND TRADEMARK OFFICE
CERTIFICATE OF CORRECTION

| | |
|---|---|
| PATENT NO. | : 9,534,910 B2 |
| APPLICATION NO. | : 14/565265 |
| DATED | : January 3, 2017 |
| INVENTOR(S) | : Bunyo Okumura |

It is certified that error appears in the above-identified patent and that said Letters Patent is hereby corrected as shown below:

In the Claims

In Claim 1, Column 10, Line 13, please delete "me" and insert --the--.

Signed and Sealed this
Third Day of April, 2018

Andrei Iancu
*Director of the United States Patent and Trademark Office*